United States Patent [19]

Kinoshita

[11] Patent Number: 5,071,383

[45] Date of Patent: Dec. 10, 1991

[54] RADIO-CONTROLLED FLYING APPARATUS

[75] Inventor: Koichi Kinoshita, Tokyo, Japan

[73] Assignee: Jal Data Communications & Systems Co., Ltd., Japan

[21] Appl. No.: 565,390

[22] Filed: Aug. 10, 1990

[30] Foreign Application Priority Data

May 17, 1990 [JP] Japan .................. 2-125416

[51] Int. Cl.⁵ .................. A63H 3/06; B64B 1/34
[52] U.S. Cl. .................. 446/37; 446/37; 446/225; 244/26; 244/30; 244/31
[58] Field of Search .................. 446/36–38, 446/58, 225, 220; 244/26, 30, 31

[56] References Cited

U.S. PATENT DOCUMENTS

| 12,250 | 7/1904 | Berry | 244/30 |
| 2,408,275 | 9/1946 | Shaeffer | 446/58 |
| 3,477,168 | 11/1969 | Trodglen | 446/37 |
| 3,568,358 | 3/1971 | Bruce | 446/37 |
| 3,674,225 | 7/1972 | Johnson | 244/31 |
| 4,114,837 | 9/1978 | Pavlicka et al. | 244/30 |
| 4,461,436 | 7/1984 | Messina | 446/37 X |
| 4,891,029 | 1/1990 | Hutchinson | 446/58 |

FOREIGN PATENT DOCUMENTS 2366989  6/1978  France .................. 244/26

Primary Examiner—Danton D. DeMille
Attorney, Agent, or Firm—Lowe, Price, LeBlanc & Becker

[57] ABSTRACT

A radio-controlled flying apparatus comprising an annular buoyant body and having an overall center of gravity below the center of buoyant force of the buoyant body. The annular buoyant body contains a gas of lighter weight than air. A main body is supported by the annular buoyant body by means of a dual-axis gimbal. The main body is provided with a pair of propellers which are rotatably supported by the main body and are driven by variable-speed motors into rotation in opposite directions. The main body is further provided with a rocking mechanism for causing said main body to rock about the dual-axis gimbal. An electric circuit resides in the main body for receiving a radio wave from an external transmitter to control the rocking mechanism and variable-speed motors. The electric components in the electric circuit are supplied their power from a battery carried on the main body.

4 Claims, 8 Drawing Sheets

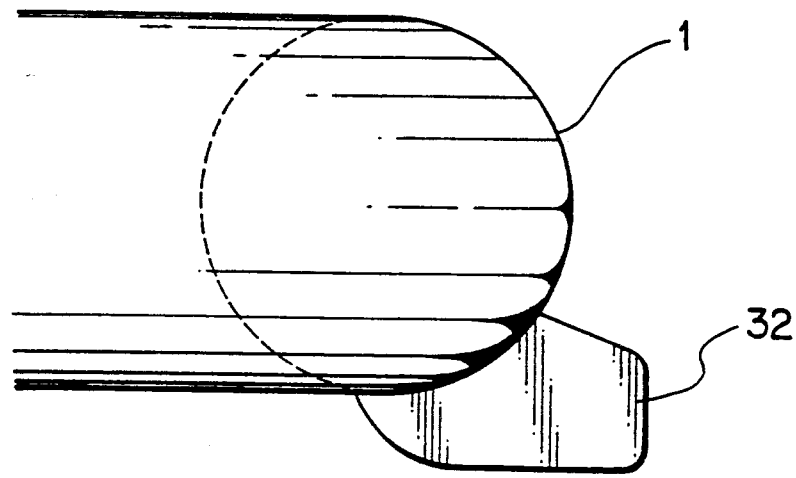
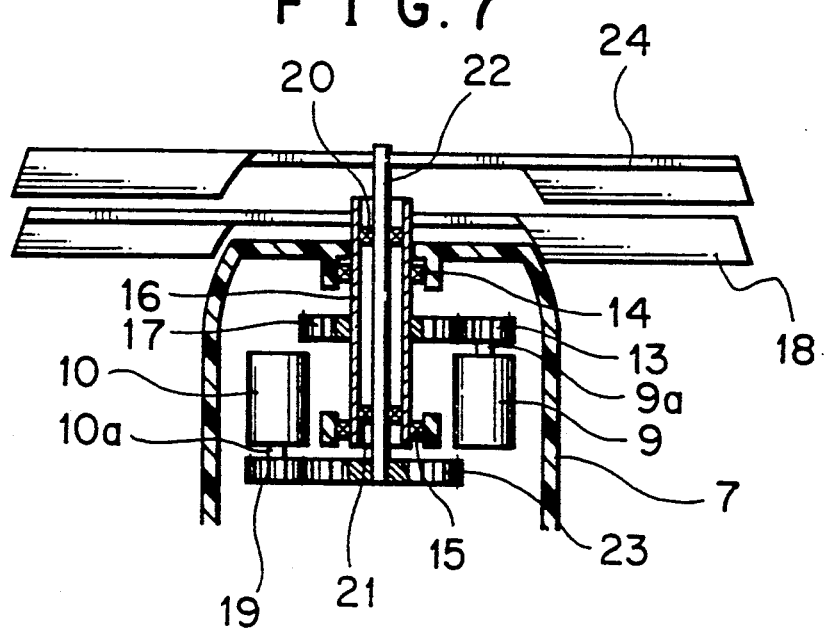

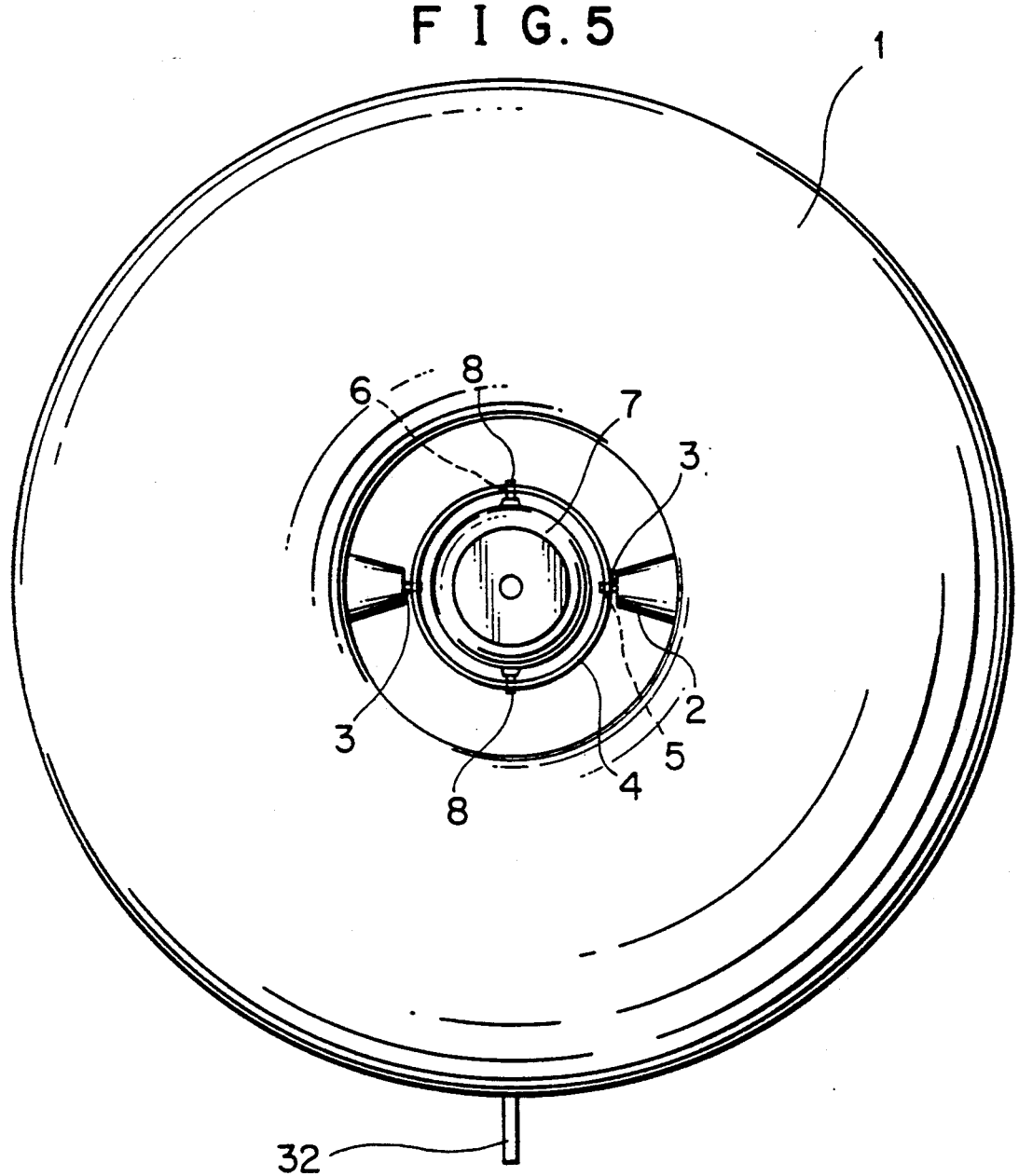

TOP VIEW

SIDE VIEW

RADIO-CONTROLLED FLYING APPARATUS

BACKGROUND OF THE INVENTION

1. Field of the Invention

The present invention relates to a radio-controlled flying apparatus which is ensured its stable vertical flight and horizontal flight including leftward/rightward flight and back and forth flight under the control of a radio controller.

2. Prior Art

A flying apparatus which flies in air under radio-controlled operation is an exciting toy not only for children but also for adults. Some flying apparatuses are of a design based on a gyro-operated mechanism. Gyro-operated apparatuses which are commercially available at present make use of two gyros (rated gyro and a free operating gyro) which are used for real flying apparatuses. The flying apparatus is controlled under radio control its movement in upward and downward, back and forth direction, and leftward and rightward direction. Controlling the flying apparatus through the use of radio control requires well developed operating skill which only expert hobbyist can manage.

A NiCd (nickel cadmium) battery of a power capability of 120 mA at 7.2 V is usually mounted on such a flying apparatus for a light overall weight. Thus, its possible, longest flight is as short as only about 1.5 minutes. For this reason, the hobbyists usually use a separate external power source located on the ground and connected to the flying apparatus through thin, light power lines.

SUMMARY OF THE INVENTION

The present invention was made to overcome the aforementioned drawbacks and provides a radio-controlled flying apparatus in which a doughnut-shaped buoyant body is incorporated for the lighter weight of the flying apparatus while at the same time the overcall center of gravity of the apparatus is set lower than the center of buoyant force of the buoyant body so as to ensure the stable position of the flying apparatus in air.

A radio-controlled flying apparatus according to the invention comprises:

an annular buoyant body (1) containing a gas therein which give a buoyant force to the annular buoyant body and having a center of buoyant force at its geometrical center;

a main body (7) supported by the annular buoyant body by means of a dual-axis gimbal;

a pair of propellers (18, 24) which rotate in opposite directions;

a rocking mechanism (26, 29, 30, 11, 11a, 12, 12a) for causing the main body to rock about the dual-axis gimbal;

variable-speed motors (9, 10) for driving the pair of propellers into rotation;

an electric circuit for receiving a radio wave from an external transmitter, the radio wave carrying control information for controlling the rocking mechanism and variable-speed motors; and a battery for supplying an electric power to electric components; wherein the buoyant body is positioned such that the flying apparatus has an overall center of gravity at a position below the center of buoyant force of the buoyant body.

BRIEF DESCRIPTION OF THE DRAWINGS

Features and other objects of the invention will be more apparent from the description of the preferred embodiments with reference to the accompanying drawings in which:

FIG. 4 is a cross-sectional view taken along the lines IV—IV in FIG. 2;

FIG. 5 is a top plan view showing a dual-axis gimbal;

FIG. 7 is a cross-sectional view of a reversely-rotating dual-type propeller used for the present invention;

DETAILED DESCRIPTION OF THE PREFERRED EMBODIMENTS

Figure 1:
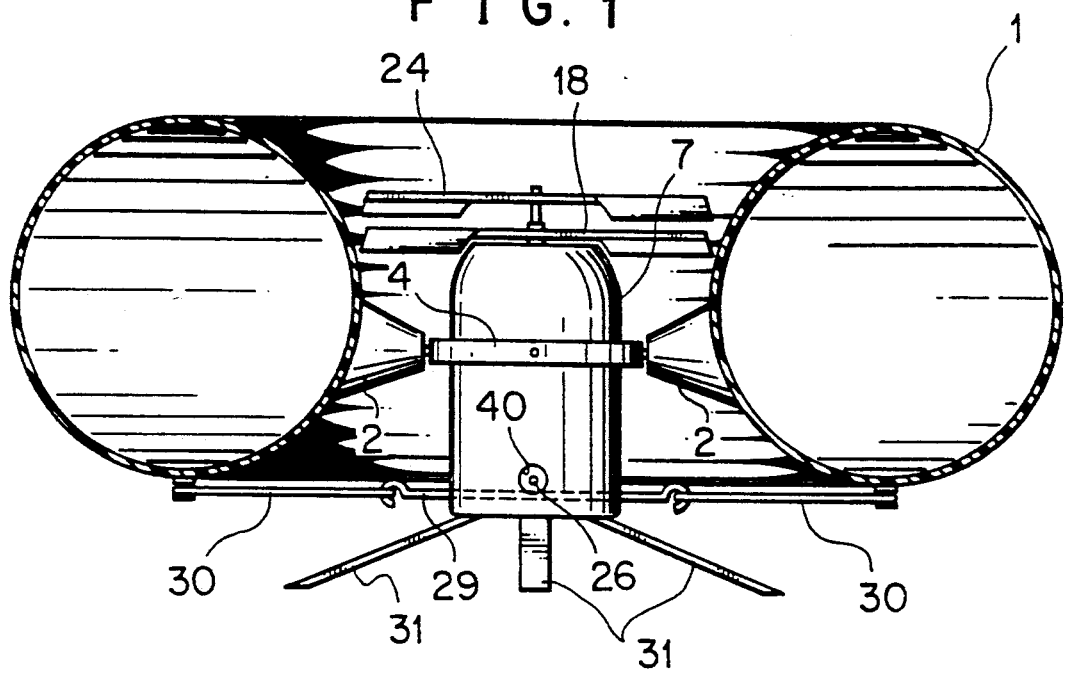
FIG. 1 is a front elevational view, partly in cross section, showing a radio-controlled flying apparatus according to the present invention.

Referring to the drawings, an embodiment of the present invention will now be described.

Figure 3:
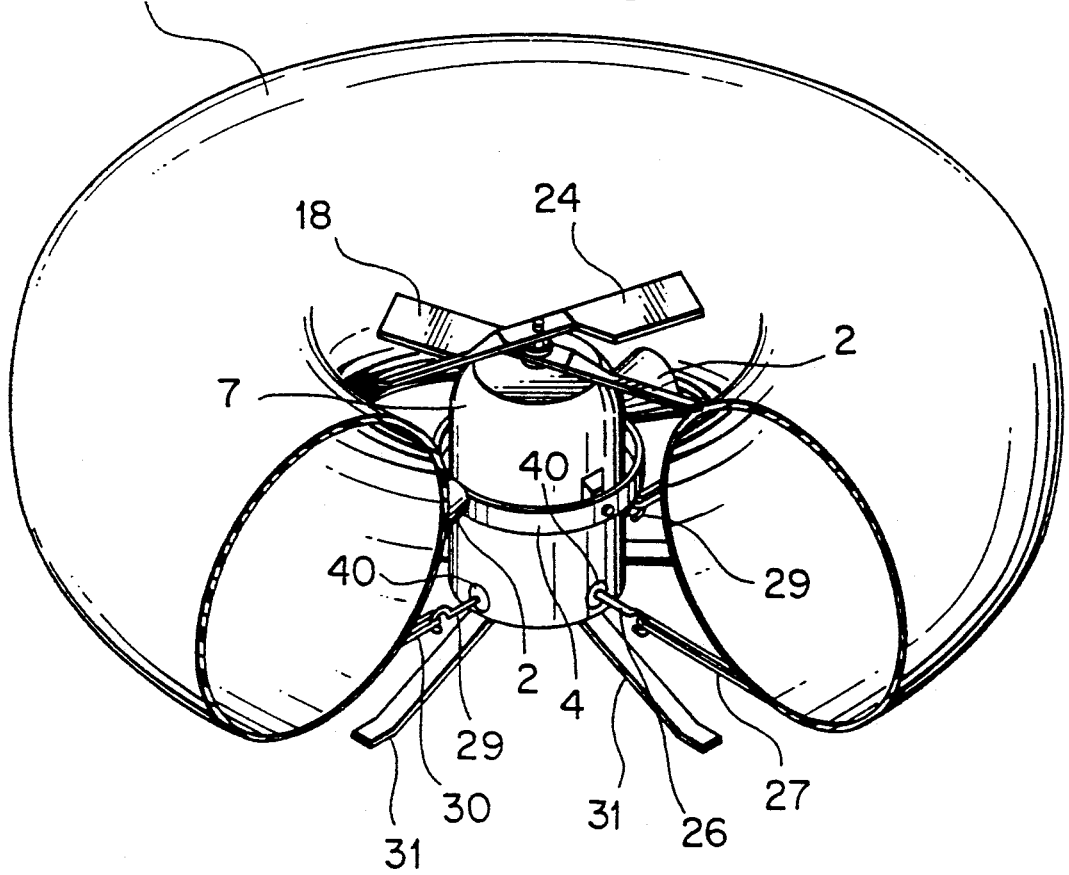
FIG. 3 is a perspective view, partly in cross section, of the flying apparatus of FIG. 1.
Figure 2:
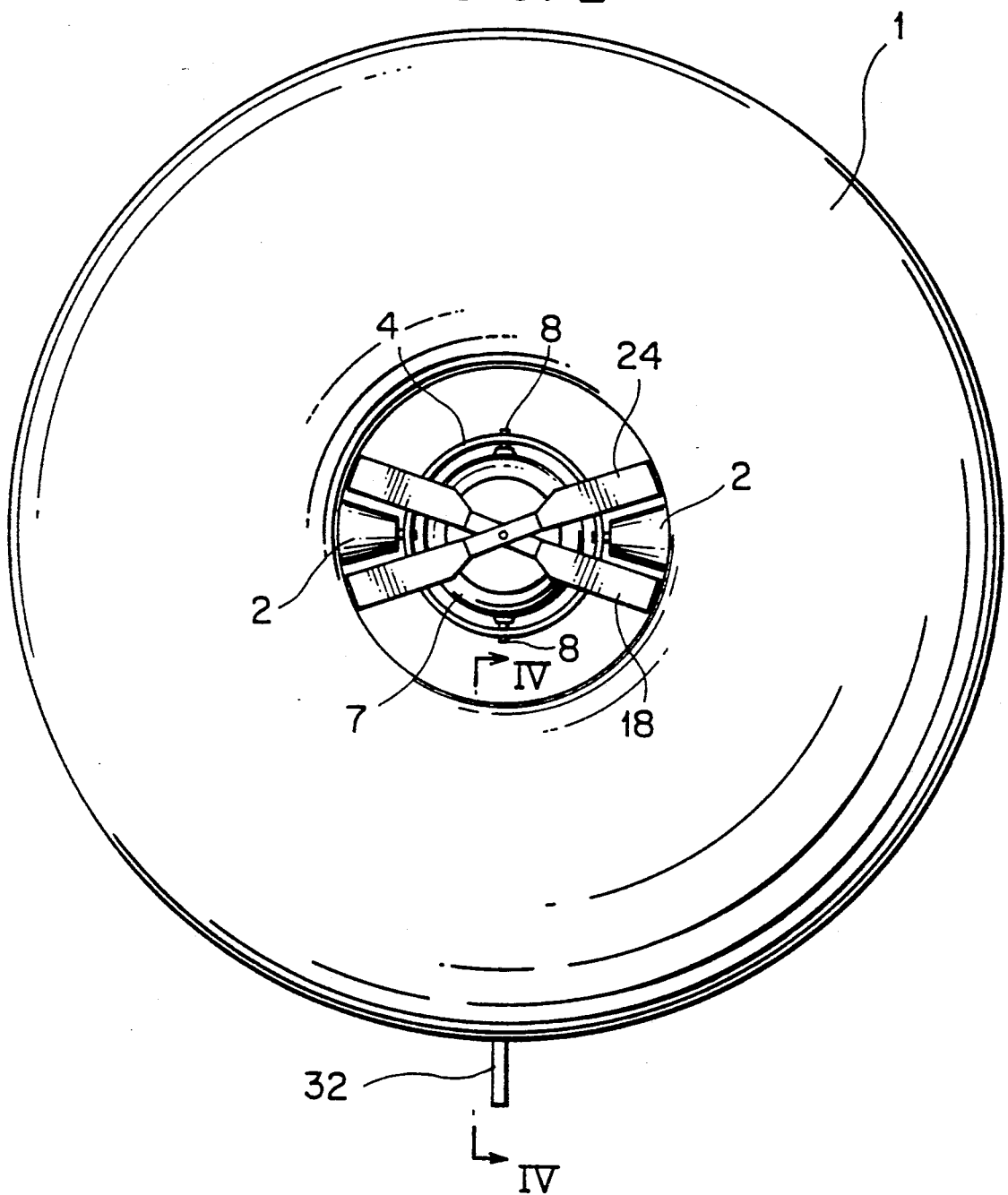
FIG. 2 is a top plan view of the flying apparatus of FIG. 1.

FIG. 1 is a front elevational view, partly in cross section, showing a radio-controlled flying apparatus according to the invention; FIG. 2 is a top plan view of the flying apparatus in FIG. 1; and FIG. 3 is a perspective view, partly in cross section, of the flying apparatus in FIG. 1. A doughnut-shaped buoyant body 1 has a circular cross section and is filled with a gas such as helium gas lighter than air and non-flammable. The buoyant force of the body 1 serves to effectively decrease the overall weight of the flying apparatus by about 30%. The buoyant body 1 is provided with a pair of shaft-supporting blocks 2 at opposed locations on the inner side of the annular shape of body 1. A ring 4 is formed with two holes 5 at diametrically opposed locations thereof, through which the ring 4 is rotatably supported by the supporting blocks 2 by means of two supporting pins 3 projecting from the supporting blocks 2 into the holes 5. The ring 4 is also formed with two holes 6 at diametrically opposed locations thereof midway between the holes 5. A main body 7 is supported on the inside of the ring 4 by means of two supporting pins 8 which project from the main body 7 into the holes 6. This construction forms a dual-axis gimbal in which the supporting pins 3 rotatably supports the ring 4 which in turn supports the main body 7 through the supporting pins 8. Landing gears 31 are provided at the bottom of the main body 7 as shown in FIGS. 1 and 3 and a tail fin 32 is provided at the rear end of the buoyant body 1 as shown in FIGS. 2 and 4. Thus, the "pilot" on the ground knows from this tail fin 32 the orientation of the round, circular flying apparatus.

Figure 6:
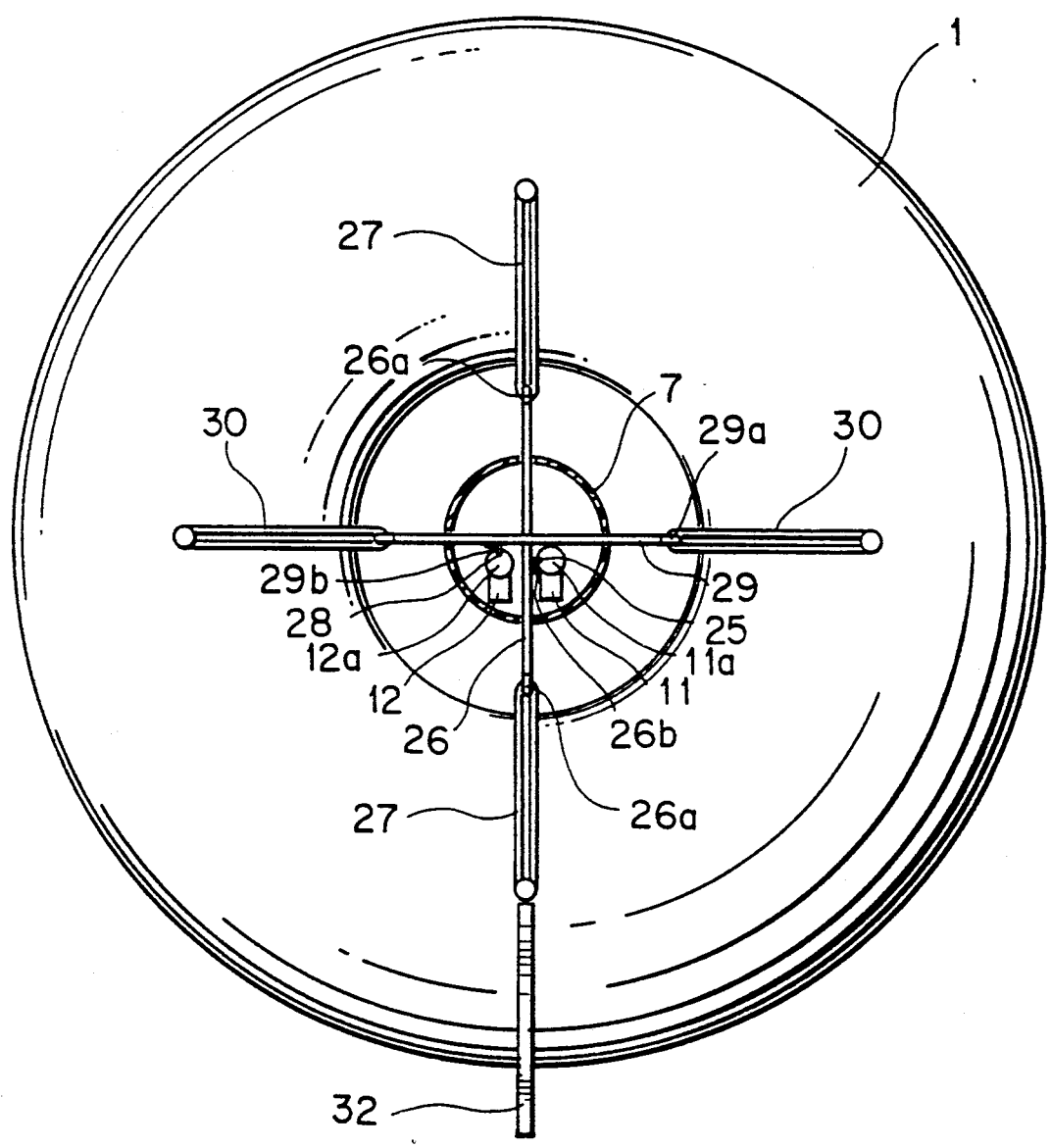
FIG. 6 is a top plan view, partly in cross-section, showing two servo motors and surrounding parts.

The main body 7 is a cylindrical casing made of light weight material such as foamed styrol which houses two printed circuit boards as a controlling circuit (not shown) positioned at right angles to each other. On each printed circuit board is mounted a variable-speed motor 9 or 10 and a servo motor 11 or 12 as shown in FIGS. 6 and 7.

In FIG. 7, a pinion 13 is secured to the output shaft 9a of the variable-speed motor 9. The pinion 13 is in mesh with a gear 17 securely fitted on a sleeve shaft 16 which in turn is supported by the main body 7 through bearings 14 and 15. The sleeve shaft 16 projects outwardly of the main body 7 and is securely attached at its tip end portion a propeller 18. A pinion 19 is secured to the output shaft 10a of the variable-speed motor 10. The pinion 19 is in mesh with a gear 23 securely fitted on a shaft 22 which in turn is supported by the sleeve shaft 19 through bearings 20 and 21. The sleeve shaft 22 extends through the shaft 16 to project further than the upper open end of the shaft 16 where a propeller 24 is securely attached to the tip end portion of the shaft 22. The angle of attack of the blades of the propeller 24 is selected to be equal to that of the propeller 18. The propeller 24 rotates in a direction opposite to that in which the propeller 18 rotates. Therefore, when both the propellers 24 and 18 rotate simultaneously at the same speed, the rotation of the two propellers will not cause the fuselage of the flying apparatus to rotate. As shown in FIG. 6, a pair of rods 26 and 29 are attached to the bottom of buoyant body 1 such that the rod 26 and the rod 29 cross at their middle portion thereof. They are each supported by a connecting member 30, which is secured at its one end to the buoyant body 1, through a hook portions 26a or 29a. The connecting member can take the form of a rubber ring or a length of wire. The rods 26 and 29 extend through holes 40 formed in the lower end portion of the main body 7. The holes 40 have a diameter large enough so that the main body 7 is allowed to freely rock about the pins 8 and about the pins 3 relative to the rods.

Figure 8:
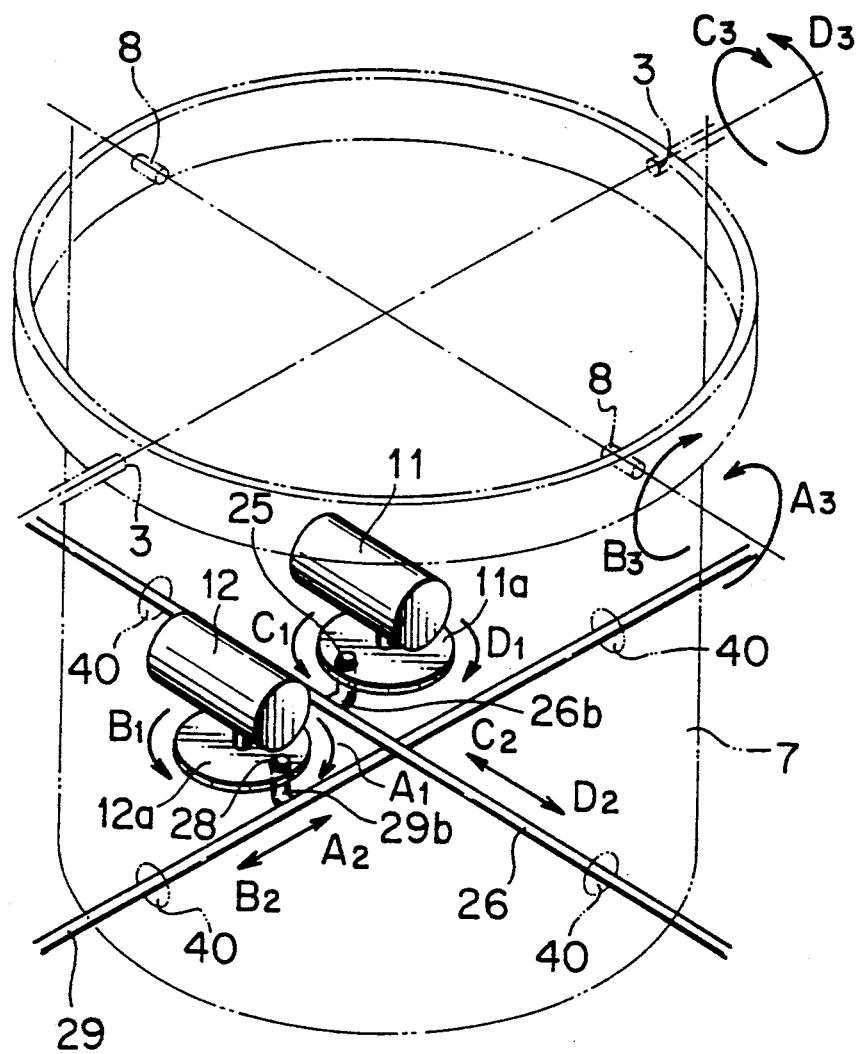
FIG. 8 is a perspective view of a rocking mechanism of the invention.

FIG. 8 is a perspective view of a rocking mechanism of the invention. The serve motor 11 mounted on one of the printed circuit boards is securely attached a rotating disk 11a thereon in which a hole 25 is formed.

The rod 26 has a pin 26b extending therefrom and having a bent tip end portion which is loosely fitted into the hole 25. The servo motor drives the disk 11a into rotation, so that holes 25 are displaced relative to the servo motor 11. Since the rod 26 is confined to the buoyant body 1, the disk 11a rather moves relative to the rod 26, causing the main body 7 to rock about the pins 3. When the disk 11a rotates in the direction C1, the main body 7 displaces in the direction C2 and therefore rock in the direction C3. When the disk 11a rotates in the direction D1, the main body 7 displaces in the direction D2 and thus rock in the direction D3.

Likewise, the serve motor 12 mounted on the other printed circuit board is attached a rotating disk 12a which is formed with a hole 28 disposed circumferentially therein.

The rod 29 has a pin extending therefrom and having a bent tip end portion which is loosely fitted into the hole 28. The servo motor 21 drives the disk 12a into rotation, so that holes 28 are displaced relative to the servo motor 12. Since the rod 29 is confined to the buoyant body 1, the disk 12a rather moves relative to the rod 29, causing the main body 7 to rock about the pins 8. When the disk 11a rotates in the direction A1, the main body 7 displaces in the direction A2.

It should be noted that when, for example, the servo motor 12 drives the disk 12a into rotation to cause the main body 7 to rock about the pins 8, the rod 26 also tends to rock together with the main body 7 as the rod 26 is drivingly connected to the main body 7 through the motor 11. Therefore, the hook-engaging construction of the connecting member 30 with the rod 26 allows the deflection of the construction transverse to its longitudinal direction such that the interlocked relation between the rod 26 and the motor 11 secured to the main body will not disturb the smooth rocking motion of the main body when the servo motor 12 is in operation. Likewise, when the servo motor 11 drives the disk 11a into rotation to cause the main body 7 to rock about the pins 3, the hook-engaging construction of the connecting member 30 with the rod 29 allows the deflection of the construction transverse to its longitudinal direction such that the interlocked relation between the rod 29 and the motor 12 secured to the main body will not disturb the smooth rocking motion of the main body.

The main body 7 is supported by the dual-gimbal such that the whole construction of the main body 7 and the associated structures mounted thereon has its center of gravity at a location much lower than the center of buoyant force of the buoyant body 1. Therefore, the flying apparatus of the above-mentioned construction, exhibits excellent positional stability during flight. The buoyant force of the buoyant body is selected to be about 30% of the total weight of the flying apparatus, permitting the reduction of the overall weight of and the miniaturization of the apparatus.

Figure 9A:
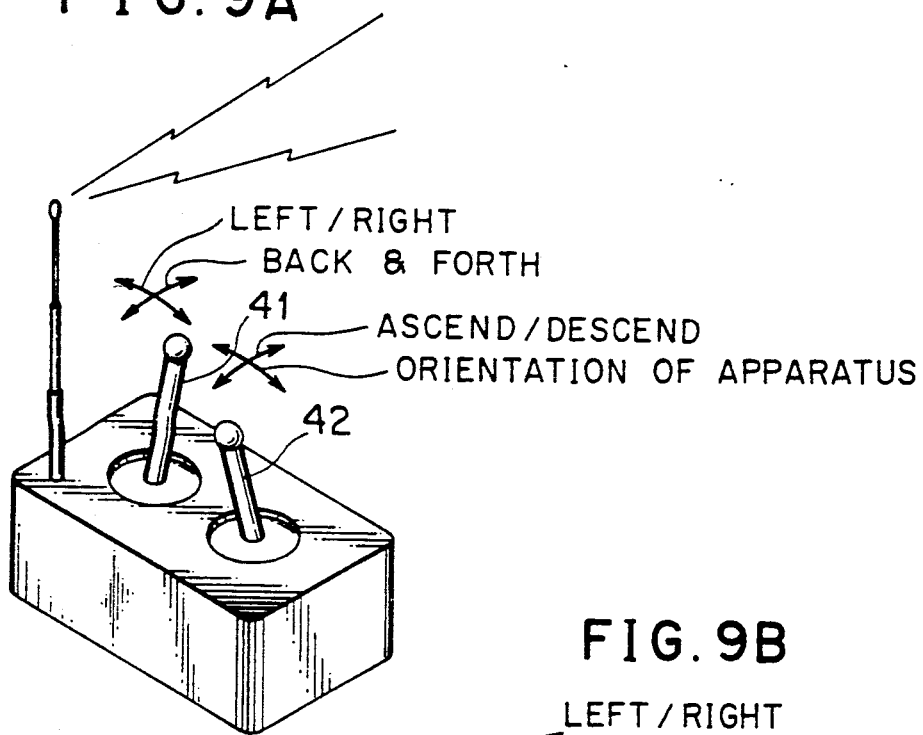
FIG. 9A shows a radio controller for the present invention.
Figure 9B:
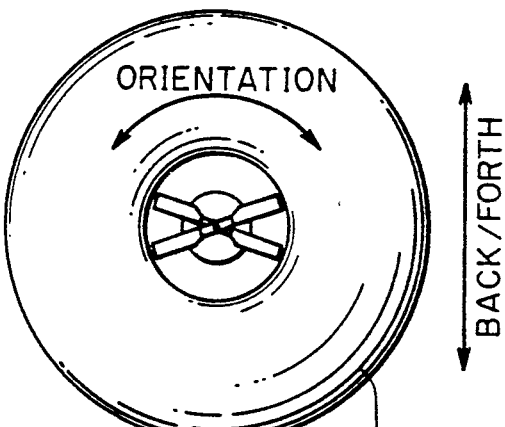
FIGS. 9B and 9C show the orientation of the flying apparatus when controlled by the radio controller.
Figure 9C:
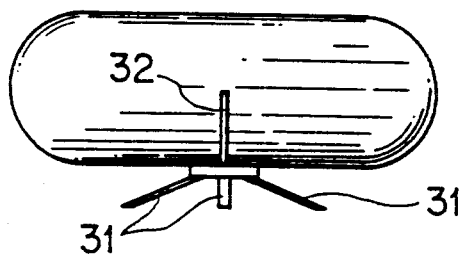

A radio controller for this flying apparatus shown in FIG. 9A is provided with, for example, a first stick 41 and a second stick 42 with which the "pilot" on the ground operates the two servo motors 11 and 12 and two variable-speed motors 9 and 10. FIGS. 9B and 9C show the orientation of the flying apparatus when controlled by the radio controller. Operating the first stick 41 back and forth causes the main body to tilt back and forth and operating leftward and rightward permits the leftward and rightward tilt of the main body. Operating the second stick 42 back and forth causes the main body to ascend or descend and operating leftward and rightward determines the direction in which the apparatus is oriented. The radio controller transmits control signals from a transmitter built therein. The controlling circuit on the two printed circuit board mounted on the main body 7 receives the control signals.

Figure 10:
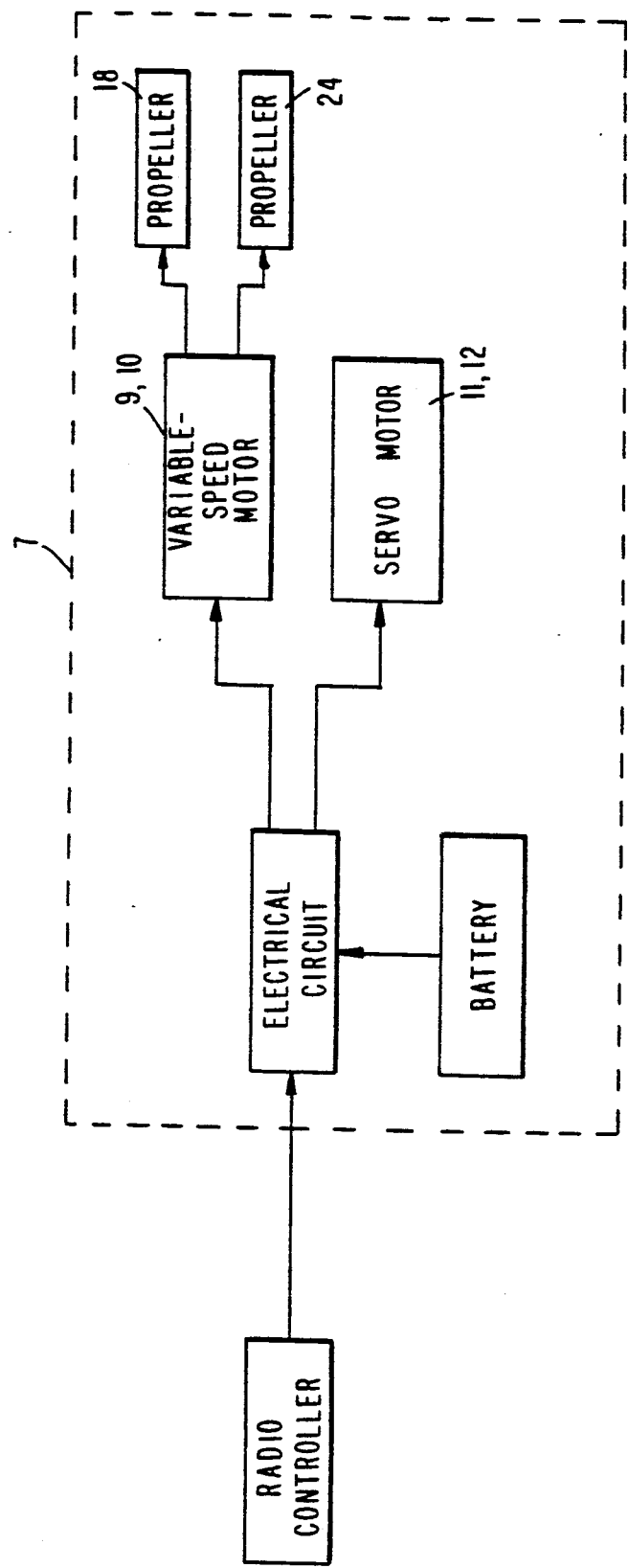
FIG. 10 is a block diagram of the flying apparatus receiving commands from a radio controller.

FIG. 10 is a block diagram of the flying apparatus receiving control information from an external radio controller. An electric circuit housed in main body 7 of the apparatus receives a radio signal from an external radio controller for controlling rocking mechanism servo motors 11 and 12 and variable speed motors 9 and 10. The variable speed motors are attached to propellers 18 and 24 which rotate in opposite directions. A battery supplies power to the apparatus to power the electric circuits including the variable speed motors and servo motors.

OPERATION

The "pilot" on the ground operates the sticks 41 and 42 on the radio controller shown in FIG. 9A for transmitting a radio wave to remotely radio-control the flying apparatus. On the other hand, the controlling circuit on the two printed circuit board mounted on the main body 7 receives the control signals. The propellers 18 and 24 rotate at the same speed such that no force is developed to cause the fuselage of the flying apparatus to rotate. When the speeds of the propellers are increased or decreased by the same amount, the flying apparatus will go up or down smoothly without drifting horizontally.

When the propellers 18 and 24 are rotated at slightly different speeds from each other, the small difference in speed between the two propellers results in a torque that tends to cause the flying apparatus to rotate. The "pilot" on the ground can observe the slow and smooth rotation of the flying apparatus from the movement of the tail fin 32.

Varying the propeller-speeds may cause the ascending motion or descending motion of the flying apparatus, in which case the speed of one of the propellers may be decreased by the same amount of the increase in the speed of the other so that the flying apparatus can still hover at the same altitude.

When the stick is operated to cause one of the servo motors 11 and 12 to operate, the main body 7 is tilted such that the flying apparatus moves in the direction where the main body 7 is tilted. Since the overall center of gravity of the flying apparatus is located sufficiently below the center of buoyant force of the buoyant body 1, the flying apparatus flies with excellent stability.

When the servo motors operate, the buoyant body 1 first tilts and then recovers its original position due to the fact that the overall center of gravity of the flying apparatus is located much lower than the center of buoyant force of the buoyant body 1. Then, the entire main body 7 including the propellers tilts such that the flying apparatus displaces in the direction in which the main body 7 tilts.

What is claimed is:

1. A radio-controlled flying apparatus comprising:
    an annular buoyant body containing a gas therein which gives a buoyant force to said annular buoyant body, said annular buoyant body having a center of buoyant force at its geometrical center;
    a main body supported by said annular buoyant body by means of a dual-axis gimbal;
    first and second propellers having an equal angle of attack and being rotated in opposite directions, each of said propellers being rotated at a rotational speed independent of the other propeller;
    a rocking mechanism for causing said main body to rock about the dual-axis gimbal;
    variable-speed motors for driving said pair of propellers into rotation, including a first motor and a second motor, said first propeller securely attached to a sleeve shaft which is rotatably supported by said main body and is driven by said first motor, said second propeller securely attached to a rod shaft which extends longitudinally through said sleeve shaft and is rotatably supported by said sleeve shaft;
    an electric circuit for receiving a radio wave from an external transmitter, said radio wave carrying control information for controlling said rocking mechanism and variable-speed motors; and
    a battery for supplying an electric power to electric components,
    said buoyant body positioned such that said flying apparatus has an overall center of gravity at a position below said center of buoyant force of said buoyant body.

2. A radio-controlled flying apparatus comprising:
    an annular buoyant body containing a gas therein which gives a buoyant force to said annular buoyant body, said annular buoyant body having a center of buoyant force at its geometrical center;
    a main body supported by said annular buoyant body by means of a dual-axis gimbal;
    a pair of propellers which rotate in opposite directions;
    a rocking mechanism for causing said main body to rock about the dual-axis gimbal, said rocking mechanism including
        (i) first rod and a second rod which cross at their middle portions substantially at a right angle, each of which being connected at two ends thereof to said buoyant body through connecting members,
        (ii) a first servo motor mounted on said main body and drivingly connected at an output shaft thereof to said first rod such that the first servo motor moves relative to said first rod along the longitudinal direction of said first rod to cause said main body to rock about said dual-axis gimbal when said first servo motor is operated, and
        (iii) a second servo motor mounted on said main body and drivingly connected to an output shaft thereof to said second rod such that the second servo motor moves relative to said second rod along the longitudinal direction of said second rod to cause said main body to rock about said dual-axis gimbal when said second servo motor is operated;
    variable-speed motors for driving said pair of propellers into rotation;
    an electric circuit for receiving a radio wave from an external transmitter, said radio wave carrying control information for controlling said rocking mechanism and variable-speed motors; and
    a battery for supplying an electric power to electric components,
    wherein said buoyant body is positioned such that said flying apparatus has an overall center of gravity at a position below said center of buoyant force of said buoyant body.

3. A radio-controlled flying apparatus according to claim 2, wherein said connecting member is made of rubber.

4. A radio-controlled flying apparatus according to claim 2, wherein said connecting member is made of wire.

* * * * *